United States Patent [19]

Johnson

[11] 4,361,667

[45] Nov. 30, 1982

[54] POLY(PARABANIC ACID) FILMS HAVING IMPROVED FLAMMABILITY RESISTANCE BY THE ADDITION OF COPPER CHELATES AND ORGANO HALIDES

[75] Inventor: Burnett H. Johnson, Baytown, Tex.

[73] Assignee: Exxon Research & Engineering Co., Florham Park, N.J.

[21] Appl. No.: 198,329

[22] Filed: Oct. 20, 1980

[51] Int. Cl.³ .......................... C08K 5/42; C08K 5/13
[52] U.S. Cl. .................................. 524/327; 524/371; 524/466; 524/469; 524/589; 524/399
[58] Field of Search ............... 260/45.75 C, 45.7 RL, 260/45.95 G; 524/327, 371, 466, 469, 589

[56] References Cited

U.S. PATENT DOCUMENTS

| | | | |
|---|---|---|---|
| 3,547,897 | 12/1980 | Patton | 260/77.5 |
| 3,591,562 | 7/1971 | Patton | 528/51 |
| 3,635,905 | 1/1972 | Patton | 260/77.5 R |
| 3,661,859 | 5/1972 | Patton | 260/77.5 CH |
| 3,901,847 | 8/1975 | Johnson et al. | 260/45.7 PS |
| 4,022,751 | 5/1977 | Johnson | 260/45.75 C |
| 4,228,066 | 10/1980 | Johnson | 260/45.75 C |

OTHER PUBLICATIONS

Modern Plastics Encyclopedia, pp. 691-695, 1981-82 edition.

*Primary Examiner*—V. P. Hoke
*Attorney, Agent, or Firm*—M. B. Kurtzman

[57] ABSTRACT

Thin films of about 1 to 5 mil thick of poly(parabanic acid) (PPA-M form) containing halogenated flame retardants have the flame retardancy enhanced by the addition of small amounts (generally about 0.1 to 3.0 weight percent) of a copper chelate compound.

9 Claims, No Drawings

POLY(PARABANIC ACID) FILMS HAVING IMPROVED FLAMMABILITY RESISTANCE BY THE ADDITION OF COPPER CHELATES AND ORGANO HALIDES

OTHER APPLICATIONS

This application is related to U.S. Pat. No. 4,022,751 and U.S. Ser. No. 29,597 filed Apr. 12, 1979, now Pat. No. 4,228,066.

FIELD OF THE INVENTION

This invention relates to thin films of polyparabanic acid having improved flame retardant properties.

DESCRIPTION OF THE PRIOR ART

In U.S. Pat. No. 4,022,751, it is disclosed that copper, nickel and cobalt salts of inorganic and organic acids, and also the metal chelates can be employed for the stabilization of high temperature polymers such as polyparabanic (PPA) acids against thermal oxidation degradation. The stabilizing effect of $CuCl_2$ was evaluated in films of PPA of about 2 mil thickness alone and with octabromobiphenyl which is a preferred flame retardant for PPA. The evaluation showed that $CuCl_2$ was a thermal stabilizer for PPA and effective in compositions also containing the preferred flame retardant.

The poly(parabanic acids) also designated as poly(1,3-imidazolidine-2,4,5-triones) may be prepared, for example, by the acid hydrolysis of poly(iminoimidazolidinediones) and contain the imidazolidinetrione ring in the repeat units:

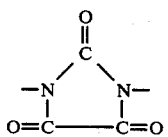

U.S. Pat. No. 3,609,113 and German Pat. No. 1,770,146 describe procedures for preparing polymers which contain the poly(parabanic) ring.

Both the poly(iminoimidazolidinediones) and poly(-parabanic acids) and their methods of preparation are known and described in detail in U.S. Pat. No. 3,661,859, which is incorporated in its entirety herein.

The poly(iminoimidazolidinediones) may be formed by the reaction of hydrogen cyanide with a diisocyanate or mixture of diisocynates, the reaction of a dicyanoformamid or mixture of diisocyanates, or the polymerization of a cyanoformamidyl isocyanate and contain a 1,3-imidazolidinedione-1,3-diyl ring of the following structure in the repeat units:

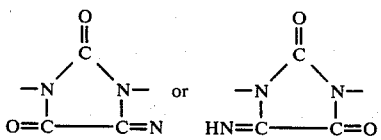

wherein NH is in the 4 to 5 position.

The polymers may contain both the 1,3-imidazolidinedione-1,3-diyl rings and the imidazolidinetrione ring, thus polymers may be broadly characterized as having the repeating unit:

$$\{Q-R\}_n$$

wherein Q is

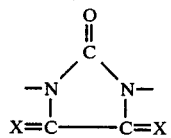

wherein X is O or NH, provided that at least one X is O, R is an organic moiety which may be aliphatic, alicyclic, aromatic or mixtures thereof, and n is sufficiently large to produce a solid product.

The R is the organic moiety of the diisocyanate when the polymer is produced according to the procedure in U.S. Pat. No. 3,661,859. Thus, the diisocyanates may be selected from a broad group having a large variety of organic moieties. The organic moieties of the diisocyanate may be substituted with groups such a alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms, (e.g., carboxylic acids, phenols, amines, etc). should not be present. Specific diisocyanates which may be used are set out in U.S. Pat. No. 3,661,859, other patents, articles or organic textbooks as known in the art.

The present invention is specific with respect to a particular polymer. That is, a polyparabanic acid prepared from diphenyl methane diisocyanate in accordance with proprietary techniques well described in patents assigned to Exxon Research and Engineering Company to result in a high performance polymer having the repeating unit shown below:

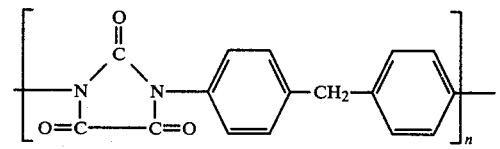

which is also designated as poly[1,4-phenylenemethylene-1,4-phenylene-1,3-(imidazolidine-2,4,5-trione)] which are also designated in chemical abstracts as poly [(2,4,5-trioxo-1,3 imidazolidinediyl)1,4-phenylene methylene-1,4-phenylene].

For purposes of convenience, this polymer species will be referred to as PPA-M.

Poly(parabanic acid) prepared from diphenylmethane diisocyanate (PPA-M) burns in air in film form up to 5 mils thick. Halogenated flame retardants when added to films of 2 mils or greater thickness at 8% or higher concentrations make the films self extinguishing, however, films of less than 2 mil thickness are not made self extinguishing by the addition of these flame retardants alone.

SUMMARY OF THE INVENTION

Briefly, the present invention relates to a PPA-M thin polymer film of about 1 to 5 mils thickness containing therein from about 4 to 8 weight percent of a halogenated flame retardant composition and an amount of selected copper compound sufficient to enhance the flame retardant properties of said flame retardant on said polymer film.

The synergistic effect of the combination of halogenated flame retardant preferably brominated flame retardants and copper chelate is demonstrated over the range of entire 1-5 mil range, however, the greater benefit is derived in the films of 2 mils or less thickness, i.e., a nominal 2 mil thickness. The thickness of the film may be designated as 2.0±0.2 mil to recognize the normal variation in film manufacture. For example, a nominal 2 mil film will, when produced commercially, have a gauge specification of 2.0±0.2 mil thickness. A PPA-M film of nominal 2 mil thickness containing the copper chelate in addition to the flame retardant composition has a margin of safety since the flame retardant properties are enhanced, whereas to obtain the same level flame retardance without the copper chelate, the nominal thickness of the film would have to be 2.2 mils, i.e., a 20% increase in polymer requirement to meet the same margin of safety.

The film would generally not be substantially less than 1 mil thick, i.e., from about 0.9 mil. The improvement in flame retardancy as measured by the Limiting Oxygen Index (LOI) ASTM D-2863 will enable 1 mil film to pass the 28 LOI specification* when the film is in accordance with the present invention. Although, the free 1 mil film is not self extinguishing the higher LOI makes composites of 1 mil film less flammable. For example, adhesive tape prepared with the present film at 1 mil thickness, having deposited thereon flame retardant adhesives has resulted in self extinguishing adhesive tape composites, whereas the 1 mil film prepared without the copper chelate is not self extinguishing when made up with the same adhesive.

*A LOI of 28 or greater is indicative of a material which will not burn.

The amount of halogenated flame retardant composition employed should generally be at least about 4 weight percent up to about 10 weight percent based on the polymer, or more preferably up to about 8 weight percent. The use of larger amounts than the optimum 8% level normally will obtain no particular advantage in flammability properties and will reduce the mechanical strength of the film since larger amounts are not soluble in the polymer. This is particularly true in the case of films of less than 2 mil thickness. The utilization of smaller amounts of flame retardant even in conjuction with the copper chelates specified will not produce the desired properties. In the case of the thicker films when the combination as claimed is employed, it should be to increase the flame retardance to highest level possible, since the flame retardant does adversely effect the oxidative stability of the polymer.

It is believed that the copper chelate acts as a catalyst which facilitates the release of the halogen in the flame retardant, this proposed mechanism is not a limitation on the scope of the invention.

Exceptional flame retardance even at the loss of some degree of oxidative stability is desirable in many applications such as the use of the films for flexible printed circuits (e.g., air bags). Whereas the highest oxidative stability is desired in other applications, for example, in films for electrical insulation.

The amount of copper chelate employed is that amount which will enhance the flame retardance properties or characteristics of the halogenated flame retardant, which is generally in the range of 0.1 to 3.0 weight percent based on polymer and more preferably about 0.5 to 1.0 weight percent.

DETAILED DESCRIPTION OF THE INVENTION

The halogenated flame retardants found to be particularly effective with PPA-M are hexabromobiphenyl, octabromodiphenyl ether, octabromobiphenyl, or a mixture thereof, which form a preferred group of halogenated flame retardants for use herein. Polybrominated aromatic compounds and particularly polybrominated biphenyl form especially preferred groups.

The chelating compounds are illustrated by dicarboxylic, acids, e.g., malonic acid; hydroxy aldehydes, e.g., salicylaldehyde; β-diketones, e.g., acetylacetone; keto esters, e.g., ethylacetoacetate and diphenyl ketones, e.g., 2-hydroxyphenones.

The various organic moieties of the chelating agents may be substituted with various radicals such as alkyls having up to 12 carbon atoms, alkoxy radicals having up to 12 carbon atoms, aryl, and arloxy having up to 12 carbon atoms and groups pendant thereon capable of forming a salt with copper such as carboxylics, sulfonics or the like, such as sulfo or carboxy.

Suitable radicals include methyl, ethyl, propyl, butyl, pentyl, hexyl, heptyl, octyl, nonyl, decyl, undecyl, dodecyl, methoxy, ethoxy, propoxy, butoxy, pentyloxy, hexoxy, heptoxy, octyloxy, nonoxy, decoxy, undecoxy, dodecoxy, phenyl, benzyl, tolyl, napthyl, phenyloxy, benzyloxy and napthyloxy.

Some other specific copper chelates include the copper chelate of 2-hydroxybenzophenone 2-hydroxy-4-methoxy-5-sulfobenzophenone, 2-hydroxy-4-methoxy-2'-carboxybenzophenone, 2,2'-dihydroxy-4-methoxybenzophenone, 2-hydroxy-4-methoxybenzophenone, 8-qinolinolate and benzoyl acetonate (cupric).

The flame retardant and copper chelate are incorporated into the films by adding the appropriate amount of these compounds to the solvent solutions of polymer prior to casting of the films. Other additives such as oxidation inhibitors, plasticizers, and the like may also be dissolved in the solvent with the resin prior to casting.

The solvents which can be employed are moderate hydrogen bonding, dipolor, aprotic solvents. These solvents are described in U.S. Pat. No. 3,661,859. The preferred solvents are N,N-dimethylformamide, N-methylpyrrolidone, N,N-dimethylacetamide and dimethyl sulfoxide.

The following examples illustrate the present invention and should not be construed to limit the present invention.

EXAMPLES 1 TO 10

The polymer employed was PPA-M ($\eta$inh=1.0). Solutions of 20% by weight of polymer in N,N-dimethylformamide and the weight percent of flame retardant and copper compound indicated in the TABLE was added to the polymer solution. Films were cast in the thickness shown in the TABLE using a commercial bandcaster and subsequently dried by passing through a tentering oven at 500° F.

Each sample was tested for vertical burn (ASTM D-568) and Limiting Oxygen Index (LOI) (ASTM D-2863). Both tests are indicative of the flammability of the polymer film.

TABLE

| Example # | Gauge Film | mils | Copper Chelate Name | % | Flame Retardant Name | % | Flammability Test LOI[1] | VB[2] |
|---|---|---|---|---|---|---|---|---|
| 1 | 21A | 1.1 | None | — | None | — | <19 | B[3] |
| 2 | #1B | 2.2 | Cu:UV284[a] | 0.6 | None | — | 23 | B |
| 3 | 1 | 2.2 | None | — | Octabromodiphenyl Ether | 8 | 31 | SE[4] |
| 4 | 7B | 2.2 | Cu:UV284 | 1.0 | Octabromodiphenyl Ether | 8 | 34 | SE |
| 5 | 23 | 2.3 | None | — | Octabromobiphenyl | 8 | 32 | SE |
| 6 | 8B | 2.1 | CU(BzAc)$_2$[b] | 1.1 | Octabromobiphenyl | 8 | 35 | SE |
| 7 | 10B | 2.0 | Cu 8-Quino[c] | 0.4 | Octabromobiphenyl | 8 | 37 | SE |
| 8 | 4 | 1.0 | None | — | Octabromobiphenyl | 8 | 26 | B |
| 9 | 8A | 1.1 | Cu(BzAc)$_2$ | 1.1 | Octabromobiphenyl | 8 | 31 | B |
| 10 | 10A | 1.2 | Cu 8-Quin | 0.4 | Octabromobiphenyl | 8 | 34 | B |

[a]Copper chelate/sulfonate of 2-hydroxy-4-methoxy-benzophenone-5-sulforic acid (copper 2-hydroxy-4-methoxy-5-sulfobenzophenone)
[b]Cupric benzoyl acetonate
[c]Copper 8-quinolinolate
[1]ASTM D 2863
[2]ASTM D 568
[3]B = burns
[4]SE = self extinguishing The groups which illustrate the invention are comparisons of (1) examples 1, 8, 9 and 10 which show that 1 mil film can be enhanced by the addition of copper chelates to give an LOI of 31-34 (26 with the flame retardant alone). (2) examples 2, 3, and 4 for 2 mil films give a similar comparison and (3) examples 2, 5, 6 and 7 which shows an enhancement of LOI from 32 to 35-37 due to the copper compound. In each instance, the copper chelate enhanced the flame retardant properties of the film whereas larger amounts of the halogenated flame retardant alone would not.

In general, the preferred polymers of the polymer-flame retardant compositions are those which have sufficient repeating units at room temperature to be solids.

In addition to the polymer, halogenated flame retardants and copper chelates, it is contemplated that other appropriate additives which are not detrimental to the compositions such as those employed to stabilize against oxidation or ultraviolet light, pigments, fillers and the like may be present.

The present polymers have been found to have high melting points, and thus are especially suitable as magnetic tapes (where good dimensional stability at high temperatures is required) for fibers, such as tire cord fibers (where tensile strength and modulus are required) for modlings for electrical connectors, bearings, magnetic wire insulation, coatings for cables, cookware, glass fabrics, industrial belts (where high temperatures are required) and the like.

The invention claimed is:

1. A composition of matter comprising about 1 mil to 5 mil thick film of poly[1,4-phenylenemethylene-1,4-phenylene-1,3-(imidazolidine-2,4,5-trione)] containing therein from about 2 to 10 weight percent of a polybrominated aromatic compound flame retardant which is one of hexabromobiphenyl, octabromodiphenyl ether, octabromobiphenyl or a mixture thereof and an amount of a copper chelate of a 2-hydroxybenzophenone sufficient to enhance the flame retardant properties of said polybrominated aromatic compound in said polymer film.

2. The composition according to claim 1 wherein said film is up to about 2.0±0.2 mils thick.

3. The composition according to claim 1 wherein the 2-hydroxybenzophenones are one of 2-hydroxybenzophenone, 2-hydroxy-4-methoxy-5-sulfobenzophenone, 2-hydroxy-4-methoxy-2'-carboxybenzophenone, 2,2'-dihydroxy-4-methoxybenzophenone and 2-hydroxy-4-hydroxybenzophenone.

4. The composition according to claim 3 wherein said copper chelate is present in from 0.1 to 2.0 weight percent in said polymer film.

5. The composition according to claim 4 wherein from about 4 to 10 weight percent flame retardant is present.

6. The composition according to claim 1 containing octabromodiphenyl ether and copper 2-hydroxy-4-methoxy-5-sulfobenzophenone.

7. A method for increasing the flame retardant properties of poly [1,4-phenylenemethylene-1,4-phenylene-1,3-(imidazolidine-2,4,5-trione)] film of from about 1 to 5 mils thick and containing a flame retardant amount of either hexabromobiphenyl, octabromodiphenyl ether, octabromobiphenyl or a mixtures thereof, which method comprises adding from about 0.1 to 3.0 weight % of a copper chelate of a 2-hydroxybenzophenone to said polymer film.

8. The method of claim 7 wherein said 2-hydroxybenzophenone is either one of 2-hydroxybenzophenone, 2-hydroxy-4-methoxy-5-sulphobenzophenone, 2-hydroxy-4-methoxy-2'-carboxybenzophenone, 2,2'-dihydroxy-4-methoxybenzophenone and 2-hydroxy-4-hydroxybenzophene.

9. The method according to claim 7 wherein from about 4 to 10 weight % flame retardant is present in the film.

* * * * *